INVENTOR.
MATHEW KUTS
BY Joseph Januszkiewicz
ATTY.

April 2, 1968 M. KUTS 3,375,745
BAND CUTTING APPARATUS
Filed April 15, 1966 2 Sheets-Sheet 2

INVENTOR.
MATHEW KUTS
BY Joseph Januszkiewicz
ATTY.

United States Patent Office 3,375,745
Patented Apr. 2, 1968

3,375,745
BAND CUTTING APPARATUS
Mathew Kuts, Akron, Ohio, assignor to The B. F. Goodrich Company, New York, N.Y., a corporation of New York
Filed Apr. 15, 1966, Ser. No. 542,924
6 Claims. (Cl. 83—176)

ABSTRACT OF THE DISCLOSURE

A cutting apparatus having a work support for holding a tubular rubber stock in a flat condition, with such support having elongated parallel slits for cooperation with a reciprocable carriage having a plurality of cutter discs which cut the tubular stock into a plurality of elongated narrow width rubber bands.

---

This invention relates to the cutting of tubular stock and more particularly to the slitting of a relatively long length of tubular rubber stock into a succession of bands of narrow width.

Difficulty has been encountered in the manufacture of elongated narrow width rubber bands for use as drive belts such as on duplicating machines due to their flexible and pliable nature. Heretofore, processing has been limited to a hand operation which is slow and tedious since it was necessary to assure uniform width of cut. Difficulty was also experienced in maintaining true edges without bevel or unevenness.

The general purpose of this invention is to cut simultaneously a plurality of narrow width rubber bands from relatively elongated tubular stock with substantially square cut edges rapidly and in an economical manner. The invention provides supporting means which properly supports a pliable flexible tubular rubber stock without distortion in fixed relationship relative to a plurality of rotatable longitudinally movable cutters.

An object of the present invention is to provide an apparatus which efficiently slits an elongated tubular stock into a plurality of narrow width elongated rubber bands.

A further object of this invention is to provide a device which effectively cuts simultaneously a plurality of rubber bands having non-deformed edges.

Other objects and features of the invention will become apparent to those skilled in the art as the disclosure is made in the following detailed description of a preferred embodiment of the invention as illustrated in the accompanying sheets of drawings in which.

Figure 3:
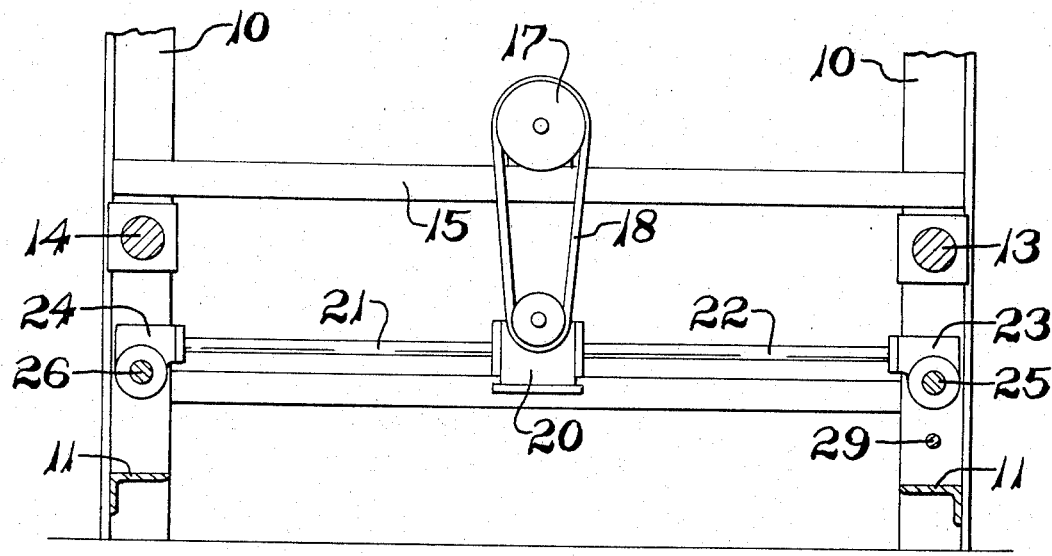
FIG. 3 shows a section of the device taken on the line 3—3 of FIG. 1.

Referring now to the drawings, numeral 10 designates vertically extending supports with suitable pairs of cross braces 11 and 12. Extending between the front and rear supports 10 along the respective side portions of the apparatus (FIG. 3) are guide rods 13 and 14. Mounted on a cross brace 15, which is located between the rearwardly disposed supports 10, is a motor 16 (FIG. 1) which has its output shaft connected via a sheave 17 and pulley belt 18 to a right angle drive unit 20. Drive nut 20 has a pair of output shafts 21 and 22 which are the input to a pair of spaced right angle drive units 23 and 24. Drive units 23 and 24 have their outputs connected to threaded rods 25 and 26 which are parallel to guide rods 13 and 14.

Figure 4:
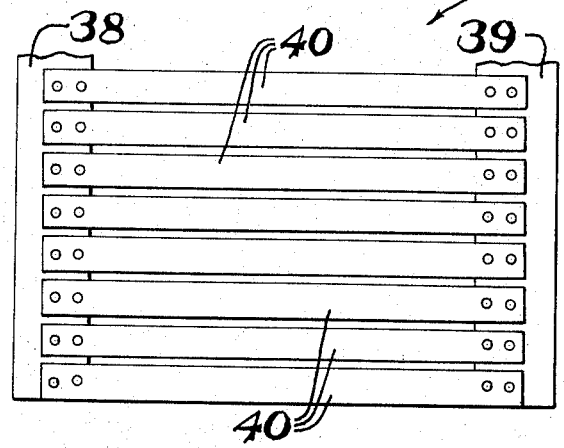
FIG. 4 is a plan view of the pallet which supports the tubular stock.

Threaded rods 25 and 26 are suitably journalled on the frame structure of the apparatus and are connected to a carriage to be described, which carriage reciprocates on the guide rods 13 and 14. Mounted below threaded rod 25 is a reciprocal tubular rod 28 which has one end slidably mounted on a rod 29 and the other end pivotally mounted on a control lever 30. Adjustably mounted on the tubular rod 28 are a pair of spaced collars 31 and 32 which have threaded screws 33 and 34 for securing such collars onto the tubular rod 28. Control lever 30 operates limit switches in switch box 35. Collar 32 through lever 30 and a limit switch operates a pneumatic cylinder 36 to be described while collar 31 through lever 30 operates to stop motor 16 and the rotation of threaded rods 25 and 26. Mounted between upper spaced cross braces 12 is a pallet 37 (FIGS. 1 and 4) which supports the tubular product to be slit. Pallet 37, as seen in FIG. 4, includes a pair of laterally spaced supports 38 and 39 which support a plurality of cross bars 40 having narrow slits therebetween for a purpose to be described.

Pallet 37 rests on a pair of spaced shoulders 41 and 42 (FIG. 1) which locate the pallet on the apparatus. A cover frame 45 pivotally mounted as at 46 on the apparatus has a flat plate 47 to which is secured a sponge 48 of limited resiliency which in cooperation with the cross bars 40 confine the tubular product in a flat condition preparatory to cutting.

Cover frame 45 is locked in position on the frame as by slotted lever 49 which engages a bracket 50 on the cover frame. Other clamping means may be employed to provide the necessary clamping action. However, the present described device is presented for simplicity.

Figure 1:
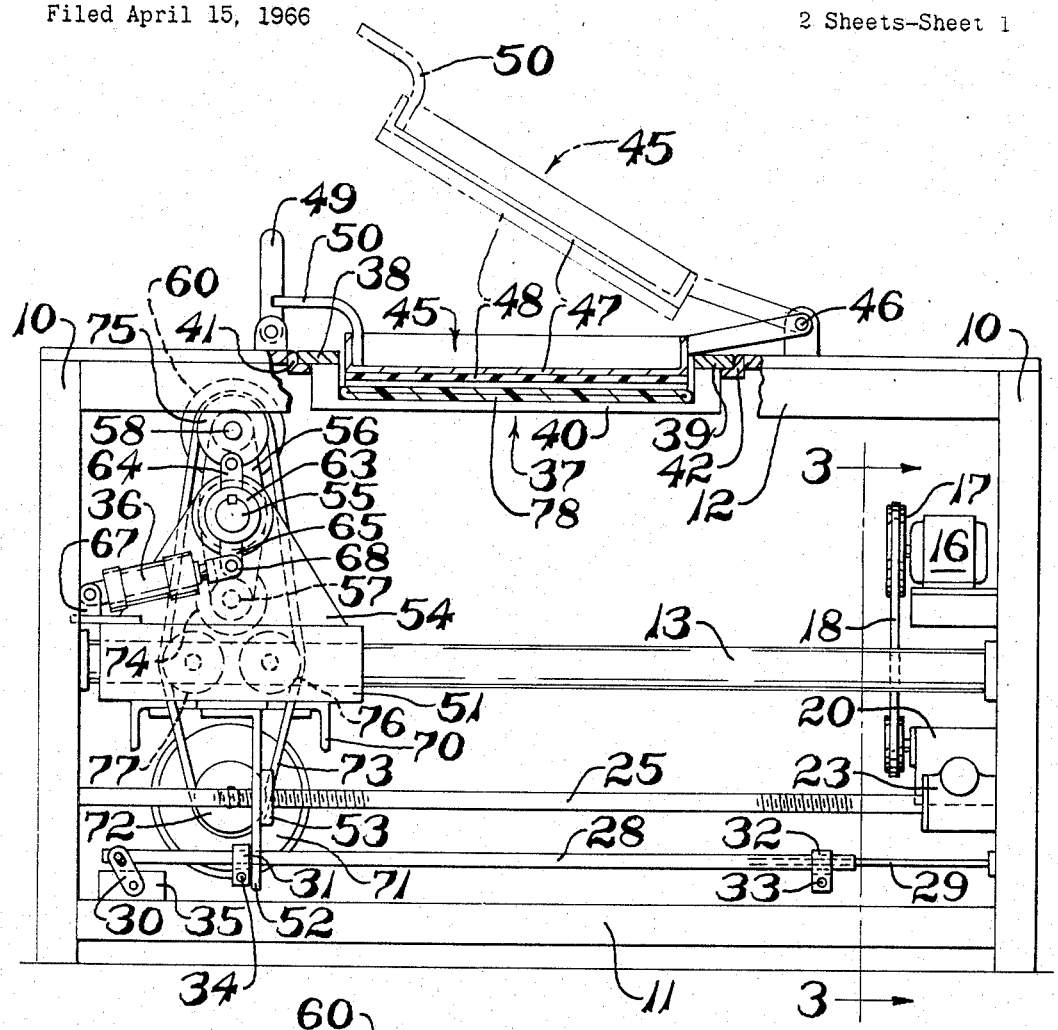
FIG. 1 is a side elevation of a preferred embodiment of the invention.
Figure 2:
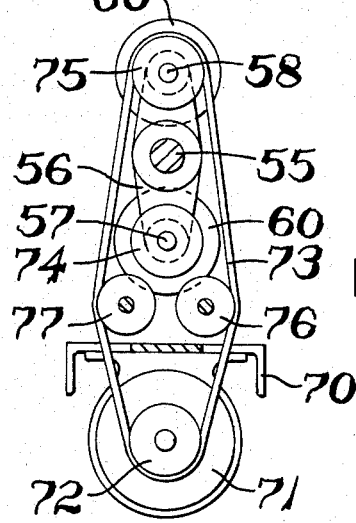
FIG. 2 is a side elevational view of the pivotal cutter holder, cutter discs, showing its driving means.
Figure 5:
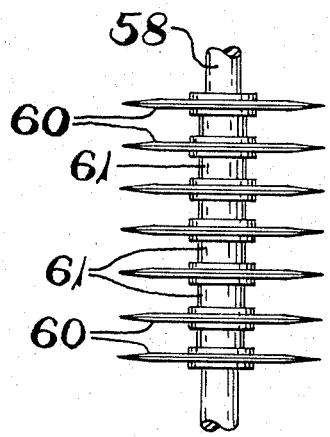
FIG. 5 is a plan view of the cutter holder and cutters.

The cutting means for the apparatus comprises a pair of spaced carriages 51 (only one shown in FIG. 1) mounted on guide rods 13 and 14, respectively. Each carriage 51 (as shown in FIG. 1) has a downwardly extending projecting bracket 52 which has a nut 53 secured thereon for threaded engagement by threaded rods 25 and 26, respectively. Carriages 51 have upwardly extending triangular brackets 54 which journal the longitudinally extending shaft 55 which supports the cutting means. Mounted on the respective end portions of shaft 55 is an elongated carrier or bracket 56 (FIG. 2) which has vertically spaced horizontally extending shafts 57 and 58 suitably journalled on the respective end portions thereof to support a plurality of cutting discs as shown in FIG. 5. Shaft 58 has a plurality of cutter discs 60 suitably mounted thereon with spacers 61 therebetween to assure proper spacing of the discs. The cutter discs 60 protrude during the cutting operation through the slits of the cross bars 40 to slit the tubular product into a plurality of narrow bands. The cutter discs 60 mounted on shaft 57 vary in their spacing from those on shaft 58 and are used alternatively to provide preselected widths in the cutting of the tubular product. The one end of shaft 55 has keyed therethrough a bracket 63 which has a pair of spaced lugs 64 and 65. The carriage 51 which is mounted for movement on guide rod 13 has a bracket 67 mounted on the upper end portion thereof which secures the cylinder end of pneumatic cylinder 36. The piston rod end of such pneumatic cylinder 36 is secured via a bifurcated lug 68 selectively to either lug 64 or 65. As seen in FIG. 1, the cutter discs 60 are in position to perform a cutting operation on the tubular product whereas pressurization of the head end of pneumatic cylinder 36 operates to pivot the cutting means counterclockwise from the position shown in FIG. 1 to move the cutter discs 60 out of contact with the tubular product supported by the pallet.

Carriage 51 has a bracket 70 mounted on its lower end portion which has secured to it a motor 71 having an output connected to drive sheave 72. A belt 73 operatively engages sheave 72 and selectively engages either a sheave 74 or sheave 75 mounted on shafts 57 and 58, respectively. A pair of idler pulleys 76 and 77 are mounted on the lower end portion of the carriage 51 to insure proper tension in the drive belt. In order to switch from the cutter discs 60 mounted on shaft 58 to the cutter discs mounted on shaft 57, bifurcated lug 68 is removed and the operator rotates the cutter discs 180° such that the lug 64 is in alignment with the previous position of lug 65 and the bifurcated lug 68 is secured thereto.

In the operation of the device, a tubular product 78 is placed on the pallet 37 and thereafter the cover frame 45 is pivoted about pivot means 46 until the sponge 48 of plate 47 engages the upper surface of tubular product 78 and is locked in position by lever 49. After energization of the apparatus, the rod end of cylinder 36 is pressurized which pivots the cutter discs 60 clockwise into the position shown in FIG. 1. Motor 16 is then energized which action rotates the threaded rods 25 and 26 which in turn moves the pair of carriages 51 in a longitudinal direction along guide rods 13 and 14 such that the cutter discs 60 slit the tubular product 78 into a plurality of narrow flexible rubber bands. Upon completion of the cut, the carriage 51 continues until downwardly extending bracket 52 engages collar 32 which pivots control lever 30 in a clockwise direction which actuates a suitable limit switch which in turn reverses the rotation of motor 16 and also actuates a suitable control valve, which control valve pressurizes the head end of pneumatic cylinder 36 which pivots the cutter discs 60 in a counterclockwise direction to move such cutter discs 60 out of engagement with the tubular product on the pallet. Such action returns the carriages and the cutter discs to their starting position until bracket 52 engages collar 31 which pivots the control lever 30 in a counterclockwise direction which stops the rotation of motor 16 and thereby conditions the apparatus for the next cycle.

It should be understood, of course, that the foregoing disclosure relates to only a preferred embodiment of the invention and that numerous modifications or alterations may be made therein without departing from the spirit and the scope of the invention as set forth in the appended claims.

I claim:

1. A belt cutting machine having a support frame, carriage means reciprocably movable in a longitudinal direction on said support frame, a cutter head having a plurality of cutter discs mounted on said carriage for movement therewith, support means on said support frame for confining an elongated tubular product in a flat condition with its open ends extending laterally relative to said longitudinal direction, said support means having a lower planar horizontal surface with slits extending vertically therethrough to provide access for cutting such tubular product, means mounted on said carriage operatively connected to said cutter head for moving said cutter head toward and away from said lower planar surface into and out of cutting engagement with such tubular product, drive means operatively connected to said carriage means for reciprocating said carriage means in said longitudinal direction, and means operatively connected to said cutter head for rotating said cutter discs.

2. A belt cutting machine as set forth in claim 1 wherein said support means comprises a lower member having a plurality of slits extending in said longitudinal direction and an upper member pivotally mounted to said support frame for cooperation with said lower member to define a chamber for confining a tubular product in a flat condition, and said upper member having a plurality of slits extending in the longitudinal direction which registers with the slits in said lower member.

3. A belt cutting machine as set forth in claim 2 wherein said upper member of said support means has a resilient cellular member cooperative with said lower member to maintain a tubular rubber product in a flat condition and said carriage having a pair of spaced cutter heads selectively positionable for movement into and out of engagement with said slits and said cellular member.

4. A belt cutting machine as set forth in claim 2 wherein said carriage means comprises a support having a pair of spaced brackets and a pivot rod extending laterally therebetween, said pivot rod extending in a horizontal direction normal to said longitudinal direction, a pair of spaced carriers mounted on said pivot rod, said spaced carriers supporting a pair of spaced shafts which extend in a direction parallel to said pivot rod, each of said shafts having a plurality of cutting discs, means operatively connected to said pivot rod for selectively pivoting said rod and said carriers for positioning said cutter disc toward and away from said support means and means operatively connected to one of said shafts to rotate said one shaft and said cutter disc associated therewith.

5. A belt cutting machine having a support frame, said support frame having a work support with a horizontally extending chamber for confining a product in a flat condition, said work support having a lower surface defining a datum plane, a carriage mounted on said support frame for reciprocable movement in a longitudinal direction, said work support having a plurality of slits extending in said longitudinal direction, a carrier mounted on said carriage for movement toward and away from said datum plane, means on said carriage operatively connected to said carrier for moving said carrier toward and away from said datum plane, said carrier having a plurality of rotatable discs cooperative with said slits to cut a tubular product in said chamber into a plurality of bands, and drive means on said carriage operatively connected to said discs for rotating said discs.

6. A belt cutting machine having a support frame with a pair of laterally spaced guide rods, said guide rods extending in a longitudinal direction, a carriage mounted on each of said guide rods for longitudinal movement thereon, each carriage having a bracket which supports one end of a pivot support rod extending in a lateral direction relative to said guide rods, drive means operatively connected to said carriage for reciprocating said carriage on said guide rods, said support rod having keyed thereto for rotation therewith a pair of elongated support brackets, the respective end portions of said support bracket having rotatable shafts extending in a direction parallel to said support rod, each shaft having a plurality of cutting discs journalled thereon for rotation therewith, said support rod having a pair of spaced lugs secured thereto, means mounted on said carriage operatively connected to one of said lugs for rotating said support rod and said support bracket about said support rod, a pallet mounted on said support frame having a lower plate member and an upper plate member wherein said lower plate member has a plurality of slits which cooperate with said plural cutting discs during reciprocation of said carriage to cut a plurality of flexible rubber bands confined between said lower and upper plate, and drive means mounted on said carriage movable therewith and operatively connected to said one shaft for rotating said shaft and said cutting discs associated therewith.

References Cited
UNITED STATES PATENTS

| 1,443,303 | 1/1923 | York | 83—176 X |
| 1,839,969 | 1/1932 | Kazanji | 83—489 X |
| 2,293,721 | 8/1942 | Engler | 83—176 X |
| 2,379,844 | 7/1945 | Weinberger | 83—471 X |

WILLIAM S. LAWSON, *Primary Examiner.*